United States Patent [19]

Williams

[11] 3,899,422

[45] Aug. 12, 1975

[54] RECIRCULATING RESIN CLEANING CHEMICAL FEEDER SYSTEM FOR WATER SOFTENERS

[76] Inventor: James L. Williams, 11782 Bonnie Brae Dr., S.W., Massillon, Ohio 44646

[22] Filed: Apr. 24, 1974

[21] Appl. No.: 463,587

[52] U.S. Cl. ............... 210/108; 210/136; 210/279
[51] Int. Cl.² ........................................ B01D 29/38
[58] Field of Search ............ 210/35, 108, 136, 197, 210/275, 279

[56] References Cited
UNITED STATES PATENTS

| | | | |
|---|---|---|---|
| 2,355,564 | 8/1944 | Sebald | 210/197 X |
| 3,395,099 | 7/1968 | Johnson | 210/275 X |
| 3,455,458 | 7/1969 | Johnson | 210/275 X |
| 3,554,377 | 9/1968 | Miller | 210/275 X |

Primary Examiner—John Adee
Attorney, Agent, or Firm—Dennison, Dennison, Townshend & Meserole

[57] ABSTRACT

A filter material cleaning tube parallels the main service tube within a filter material bed. A jet stream of cleaning fluid is introduced diagonally downward from a service tube port across the full width of the cleaning tube below the upper intake end of the cleaning tube for effecting a forced downward movement of the particulate filter material through the cleaning tube and the flow activating jet stream. A chemical feeder communicates with the cleaning tube above the cleaning fluid port for a selective drawing of a chemical cleaning additive into the jet induced flow of filter material.

2 Claims, 5 Drawing Figures

PATENTED AUG 12 1975　3,899,422

RECIRCULATING RESIN CLEANING CHEMICAL FEEDER SYSTEM FOR WATER SOFTENERS

The present invention generally relates to liquid treatment apparatus of the type utilizing a particulate filter material bed, and is more particularly directed to a backwash or cleaning cycle for such apparatus.

In apparatus of this type, for example a water softener utilizing a resin bed, the resin becomes coated with mineral particles as the water being treated moves therethrough. As will be appreciated, as this coating builds up, the efficiency of the system decreases. Accordingly, it is common practice to periodically backwash the filter material prior to a regeneration of the filter material by an appropriate ion exchange procedure.

The basic conventional backwash system involving a bottom discharge of the backwash liquid for movement up through the resin bed has been found to not be fully effective, resulting in an incomplete cleaning of the filter particles and eventually an actual forming of fluid channels through the bed with substantially no cleaning action being effected. Several solutions have been proposed which involve a more effective movement of the cleaning liquid through the filter particles, note for example U.S. Pat. No. 3,395,099 to R. D. Johnson wherein the filter particles are directed through a scrubbing tube by an axial flow of cleaning water therethrough.

It is a primary intention of the present invention to provide an improved backwash system which incorporates a scrubbing and cleaning action within a separate cleaning tube wherein the particles not only move along with the liquid flow which sets them in motion, as in the Johnson patent, but are specifically passed through the jet action flow of liquid so as to substantially enhance the cleaning action. In addition, and of equal significance, is the incorporation of a feeder for chemical additives, also under the control of the flow inducing jet stream or liquid discharge.

Basically, the apparatus of the invention includes an elongated cleaning tube affixed to the service tube along a substantial portion of the length thereof within the filter bed. This cleaning tube is open at the top and bottom for a flow of the particulate filter material therethrough. The discharge end of a feed line, which extends from an externally mounted chemical feeder, communicates with the cleaning tube below the upper intake end thereof and above a flap valve controlled port communicating the service tube with the cleaning tube. The flap valve is so orientated as to, during the normal or water softening cycle, effectively seal the port and during the backwash operation arcuately flare open into the cleaning tube so as to provide a jet distribution of the liquid from the service tube diagonally across the cleaning tube covering the full cross-sectional area thereof. The screened lower portion of the service tube is provided with an internal flexible sleeve valve which collapses inward during the normal operation of the softener through the action of the flow initially downward through the filter bed, inward through the screened or slotted end of the service tube and subsequently up through the service tube for discharge. During the backwash cycle wherein the liquid moves downwardly through the service tube, the sleeve valve seals the lower portion of the tube so as to laterally direct the liquid in a jet flow into the cleaning tube. The flow in the cleaning tube, during the backwash cycle, draws the filter material vertically downward through the cleaning tube in a circulating manner as suggested by the arrows in FIG. 1 with the filter material, in addition to moving vertically through the cleaning tube, actually passing directly through the jet flow of the cleaning liquid and being subjected to the action of the chemical additive or additives introduced immediately below the upper intake end of the cleaning tube.

Other objects and advantages will become subsequently apparent from the details of construction and operation of the apparatus as hereinafter described and claimed. Reference is had to the accompanying drawings forming a part hereof wherein like numerals refer to like parts throughout, and in which:

Figure 1:
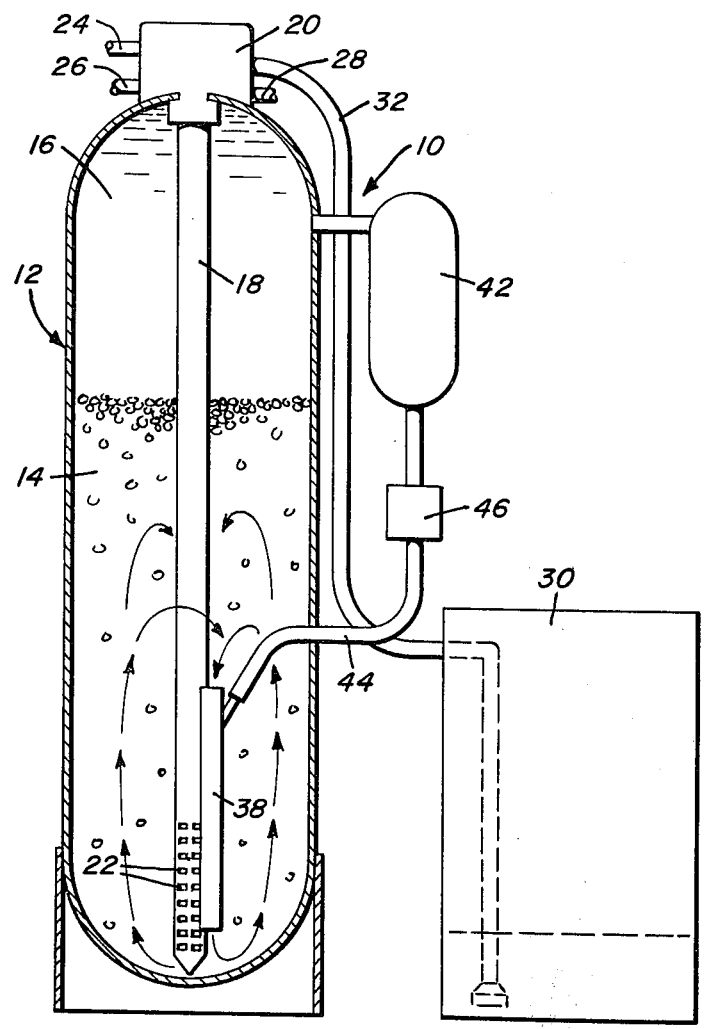
FIG. 1 is a vertical cross-sectional view through a water softener in accordance with the present invention, various components being schematically illustrated.

Referring now more specifically to the drawings, reference Numeral 10 is used to designate a liquid treatment system, specifically illustrated as a water softener system, incorporating the features of the present invention. The system 10 utilizes a vertically elongated tank 12 having a bed of an appropriate particulate filter material, such as resin, 14 therein. The tank 12 is of a height so as to provide for a liquid storage space 16 above the bed. An elongated service tube 18 extends centrally through the tank 12 from an upper valve control unit 20 which controls the flow of liquid into and out of the tank 12 either directly into the upper portion of the tank for a filtering movement thereof through the filter bed for subsequent discharge through the service tube 18 or, during a backwash cycle, through the tube 18 for ultimate discharge upward through the filter bed. The lower portion of the service tube, as is conventional, is provided with a plurality of discharge slots 22, forming in effect a screened portion. The control unit 20 itself is provided with an appropriate water intake line 24, water discharge line 26 and drain 28. An externally located brine tank 30 communicates with the control unit 20 through line 32 for a control therefrom of the flow of brine during the regenerative cycle subsequent to the backwashing.

An elongated flexibly resilient sleeve valve 34 is provided internally within the lower portion of the service tube 18 in a manner so as to selectively internally close all of the slots 22 or screened portion. This sleeve valve 34 is mounted, in any appropriate manner, so as to collapse inwardly under the pressure of the water during the normal softening cycle wherein the water moved downwardly through the filter bed 14 and in through the screening slots 22 for subsequent discharge through the service tube 18. However, upon a cessation of this inward movement of the water, the sleeve valve 34 moves outward into sealing relation with the slots 22 and, during the backwash cycle, as the water is introduced vertically downward through the service tube 18, the internal pressure generated thereby insures a positive sealing engagement of the sleeve valve 34 against the slot 22 so as to preclude the discharge of water therethrough.

Figure 3:
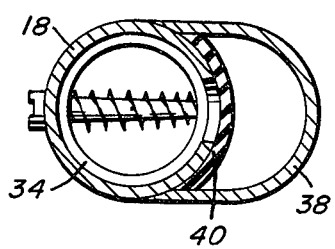
FIG. 3 is a cross-sectional view taken substantially on a plane passing along line 3—3 in FIG. 2 with the port closing flap valve in its closed position.
Figure 4:
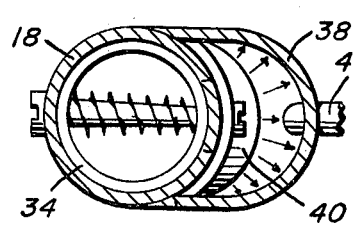
FIG. 4 is a cross-sectional view taken substantially on a plane passing along line 4—4 in FIG. 2 with the flap valve in its opened position.
Figure 5:
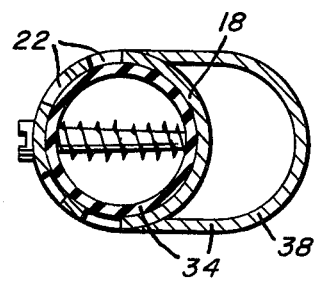
FIG. 5 is a cross-sectional detail taken substantially on a plane passing along line 5—5 in FIG. 2.

Upon a complete sealing of the slot 22, during the backwash cycle, the water is laterally directed from the service tube 18 through a port 36 through one side thereof at a point spaced above the sleeve valve 34. The water discharges into a vertically elongated cleaning tube 38 which, as will be appreciated best from FIGS. 3, 4 and 5, is directly affixed to and partially encircles the service tube 18, extending outwardly therefrom in a generally arcuate configuration. The upper and lower ends of the cleaning tube 38 are open for a forced circulation of the resin or other filter particles therethrough as suggested by the arrows in FIG. 1 and as shall be described in more details subsequently.

Figure 2:
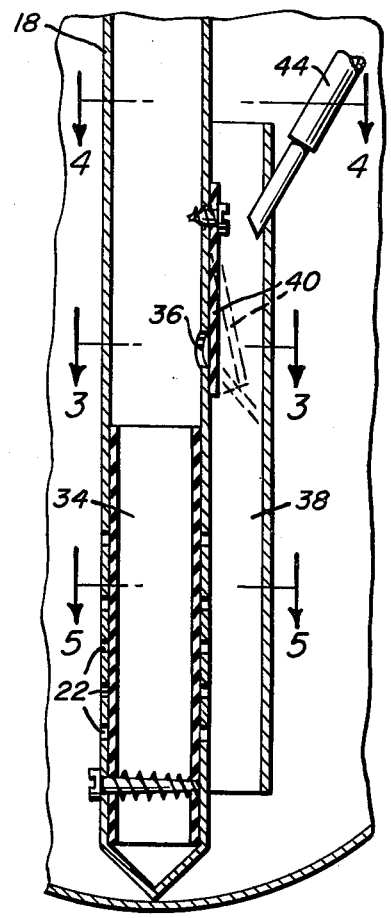
FIG. 2 is an enlarged cross-sectional detail through the cleaning tube, illustrating the relationship thereof to the service tube.

The port 36 has an overlying flap valve 40 arcuately configured so as to smoothly overlie the exterior of the service tube 18 within the cleaning tube 38 and in overlying relation to the port 36. This flap valve 40 is fixed in any appropriate manner along the upper portion thereof to the service tube so as to freely depend downward over the port 36. During the normal water softening cycle of the apparatus, the flow of water externally of the service tube 18 passes freely through the cleaning tube 38 and maintains the flap valve 40 closed as the water discharges upward through the service tube 18. However, during the backwash cycle, upon a slot sealing closing of the sleeve valve 34, the water discharges under substantial pressure through the port 36, opening the flap valve inwardly into the cleaning tube 38. Of particular significance is the generally arcuate configuration of the flap valve 40 in that, upon an inward flexing thereof, the high pressure flow of water moving through the port 36 is spread in a pattern so as to completely cover the cross-sectional area of the cleaning tube in a generally diagonal downward direction as suggested by the flow arrows in FIGS. 2 and 4. Due to the relatively short distance between the port 36 and the surrounding wall of the cleaning tube 38, the high pressure jetting action is maintained completely across the full extent of the cleaning tube 38 with the subsequent forced flow of water downward through the tube 38 resulting in a turbulent movement of the resin or filter particles vertically downward through the cleaning tube 38.

The low end of the tube 38 is located close to the bottom of the tank 12 whereby the discharging water will in effect flush the bottom of the filter bed and upwardly move the particles for a thorough recirculation thereof as suggested by the arrows in FIG. 1. The upper intake end of the cleaning tube 38 is located in spaced relation above the port 36 whereby the particles drawn into the upper end of the cleaning tube 38 for vertical movement therethrough must specifically pass through the jet flow of water rather than merely flow along therewith. In this manner a direct turbulent tumbling and cleaning of the particles is effected by the force of the water, which in effect forms a jet flow curtain through which the particles must pass. The foreign matter removed by the backwashing action will ultimately rise upwardly through the tank 12 for discharge through the drain line 28. The turbulence created by the movement of the filter particles through the cleaning tube 38 and out the discharging lower end thereof is generally transmitted to the entire filter bed for an ultimate movement of substantially all of the particles through the cleaning tube 38.

In order to enhance the cleaning action of the backwash cycle, provision is made for the introduction of chemical additives. A chemical storage tank 42 is mounted in any appropriate manner on the exterior of the main tank 12 with an elongated feeding line 44 extending therefrom into communication with the cleaning tube 38 above the flap covered port 36 and below the upper intake end. The line 44 is of course sealed to the wall of the tank 12 as it passes therethrough. Further, an appropriate check valve 46 is provided in the line 44 whereby a feeding of the chemical additive will only be effected in response to the forced flow of water through the cleaning tube 38 generated by the jet action of the water discharging downwardly into and diagonally across the cleaning tube from the service tube port 36. As will appreciated, the specific chemical additive chosen will be such so as to expedite the removal of any foreign matter from the resin, such as oil, oxidized iron, etc.

From the foregoing, it will be appreciated that the present invention constitutes a significant advance in backwashing systems for liquid treatment apparatus. More particularly, the particulate filter material is induced to flow through a curtain formed by a jet flow of water diagonally across an elongated cleaning tube, the curtain covering the full transverse extent of the cleaning tube and itself inducing the movement of the particles through the cleaning tube. In addition, specific means is provided for introducing a chemical additive into the flow of particles within the cleaning tube for enhancing the cleaning action thereof.

The above is illustrative of the principles of the invention. Modifications and variations may occur to those skilled in the art, and as such it is not desired to limit the invention to the exact construction and operation shown and described. Accordingly, all suitable modifications and equivalence may be resorted to, falling within the scope of the invention as claimed.

What is claimed is:

1. In liquid treatment apparatus comprising a tank having a bed of particulate filter material therein, an elongated liquid carrying service tube extending into the bed, a backwash system for the particulate filter material comprising an elongated cleaning tube within the bed, said cleaning tube being affixed to and extending along a portion of said service tube, the cleaning tube having an open intake end and an open discharge end, means for introducing a forced flow of backwash liquid diagonally across said cleaning tube inward of the intake end thereof and angled toward the open discharge end to induce circulation of filter particles through the cleaning tube and the diagonally directed flow, said means for introducing a forced flow of backwash liquid comprising a port in the service tube between the service tube and the cleaning tube inward of the intake end for the selective directing of a liquid flow from the service tube into the cleaning tube, and valve means normally closing said port and operatively openable in response to an internal pressure buildup in said service tube, said valve means, upon an opening thereof, being configured to direct flow diagonally across the cleaning tube substantially coextensive with the cross-section of the cleaning tube, said valve means comprising a flap valve overlying the port within the cleaning tube, said cleaning tube being generally arcuate in cross-section outward of the service tube, said flap valve being generally arcuate and secured along one arcuate end thereof to the service tube for a selective opening movement of the second arcuate end thereof into the cleaning tube and an arcuate dispersion of the liquid flow from the port.

2. The system of claim 1 including a chemical storage tank, a feed line extending from the storage tank to the cleaning tube between the intake end thereof and the port for a flow induced feeding of chemicals from the chemical storage tank into the cleaning tube.

* * * * *